United States Patent [19]

Ross

[11] Patent Number: 5,135,023
[45] Date of Patent: Aug. 4, 1992

[54] PRESSURE REGULATOR

[75] Inventor: Albert Ross, Elyria, Ohio

[73] Assignee: Western/Scott Fetzer Company, Westlake, Ohio

[21] Appl. No.: 673,150

[22] Filed: Mar. 21, 1991

[51] Int. Cl.[5] ............................................. F16K 16/06
[52] U.S. Cl. .......................... 137/505.11; 137/505.25; 137/557
[58] Field of Search ............... 137/557, 505.11, 505.25

[56] References Cited

U.S. PATENT DOCUMENTS

| | | | |
|---|---|---|---|
| 2,635,630 | 4/1953 | Cornelius | 137/557 X |
| 2,666,278 | 1/1954 | Matasovic | 137/557 |
| 3,139,902 | 7/1964 | Thomas . | |
| 3,203,246 | 8/1965 | Horwitt et al. | 137/557 X |
| 3,371,681 | 3/1968 | Thomas . | |
| 3,400,735 | 9/1968 | Favors et al. . | |
| 4,020,863 | 5/1977 | Fabish | 137/505.25 X |
| 4,181,139 | 1/1980 | Martini | 137/505.25 X |
| 4,203,467 | 5/1980 | Cardi | 137/557 |
| 4,622,857 | 11/1986 | Nelson . | |
| 4,840,195 | 6/1989 | Zabrenski | 137/557 X |
| 4,887,638 | 12/1989 | Hellquist et al. . | |

FOREIGN PATENT DOCUMENTS 403089 12/1920 Fed. Rep. of Germany ...... 137/557

*Primary Examiner*—Stephen M. Hepperle
*Attorney, Agent, or Firm*—Watts, Hoffmann, Fisher & Heinke

[57] ABSTRACT

A pressure regulator is described including an integral indicator which signals the near depletion of gas in a compressed gas cylinder to which the regulator is connected. The indicator remains extended as long as an adequate supply of gas remains in the cylinder. Upon the near depletion of the gas, the indicator withdraws into the regulator body to warn of the near depletion of gas.

7 Claims, 3 Drawing Sheets

PRESSURE REGULATOR

BACKGROUND OF THE INVENTION

1. Field of the Invention

This invention relates generally to pressure regulators for pressurized cylinders, and more particularly to a pressure regulator having a pressure-operated warning indicator that signals cylinder depletion.

2. Background Information

Pressurized cylinders or tanks are used in a wide variety of applications, such as gas welding equipment in which a supply of inert gas is delivered to a work station. Typically, the quantity of gas remaining in the cylinder is determined by a pressure gauge. Higher cylinder pressures readings indicate a greater quantity of gas within the cylinder.

Pressure regulators are commonly used with pressurized cylinders to reduce the varying and relatively high fluid pressure within the tank to a substantially constant and relatively lower delivery pressure. Typically, regulators employ a spring biased differential piston to control a throttling seat to regulate pressure. In general, regulators are either of the direct-acting type wherein the regulator seat closes against the inlet pressure, or the indirect-acting type wherein the regulator seat closes with the inlet pressure. In one prior art pressure regulator of the indirect-acting type illustrated in U.S. Pat. No. 4,622,857, pressure gauges are connected to the inlet and outlet sides of the regulator for determining tank pressure and delivery pressure respectively.

The use of conventional pressure gauges and regulators with gas cylinders has presented certain problems. For example, gas welding operators need a signal indicating the near depletion of the gas cylinder. Many pressure gauges cannot be read from a distance or from any direction. A welder is often required to stop work to move closer to face the gauge directly. Trial and error is required to learn how much welding time is available for a given gauge reading. Thus, there has been a need for an inexpensive warning indicator on pressurized cylinders indicating the near depletion of gas which can be easily seen by the operator.

SUMMARY OF THE INVENTION

An object of the present invention is to provide a regulator having an indicator for signaling the near depletion of gas stored in a cylinder.

Another object of the invention is to provide a regulator having a pressure-operated indicator which can be easily viewed from most directions at a distance.

Another object is to provide a regulator and pressure-operated indicator as described in the previous paragraph which has a simplified construction.

The present invention achieves the foregoing objectives by improving a direct-acting pressure regulator having an inlet, an outlet, a pressure chamber communicating with the outlet, and a pressure regulating piston including an inlet seal, the piston establishing a fluid flow path from the inlet to the delivery chamber and being movable in response to decreasing inlet pressure to open the inlet and maintain a regulated pressure in the chamber. The improvement comprises a pressure-operated reciprocal indicator having an end face operatively exposed to the chamber and an opposite end portion which extends from the regulator in a first viewing position until the regulated pressure in the chamber reaches a predetermined lower limit, and a spring acting on the indicator to force it into the regulator to a second position wherein the opposite end portion is hidden from view, the spring being selected in relation to the regulated pressure in the chamber, whereby the indicator is moved from the first position to the second position when the pressure reaches the lower limit.

Other objects and advantages and a fuller understanding of the invention will be had from the following detailed description of a preferred embodiment and the accompanying drawings.

DESCRIPTION OF THE PREFERRED EMBODIMENT

Figure 1:
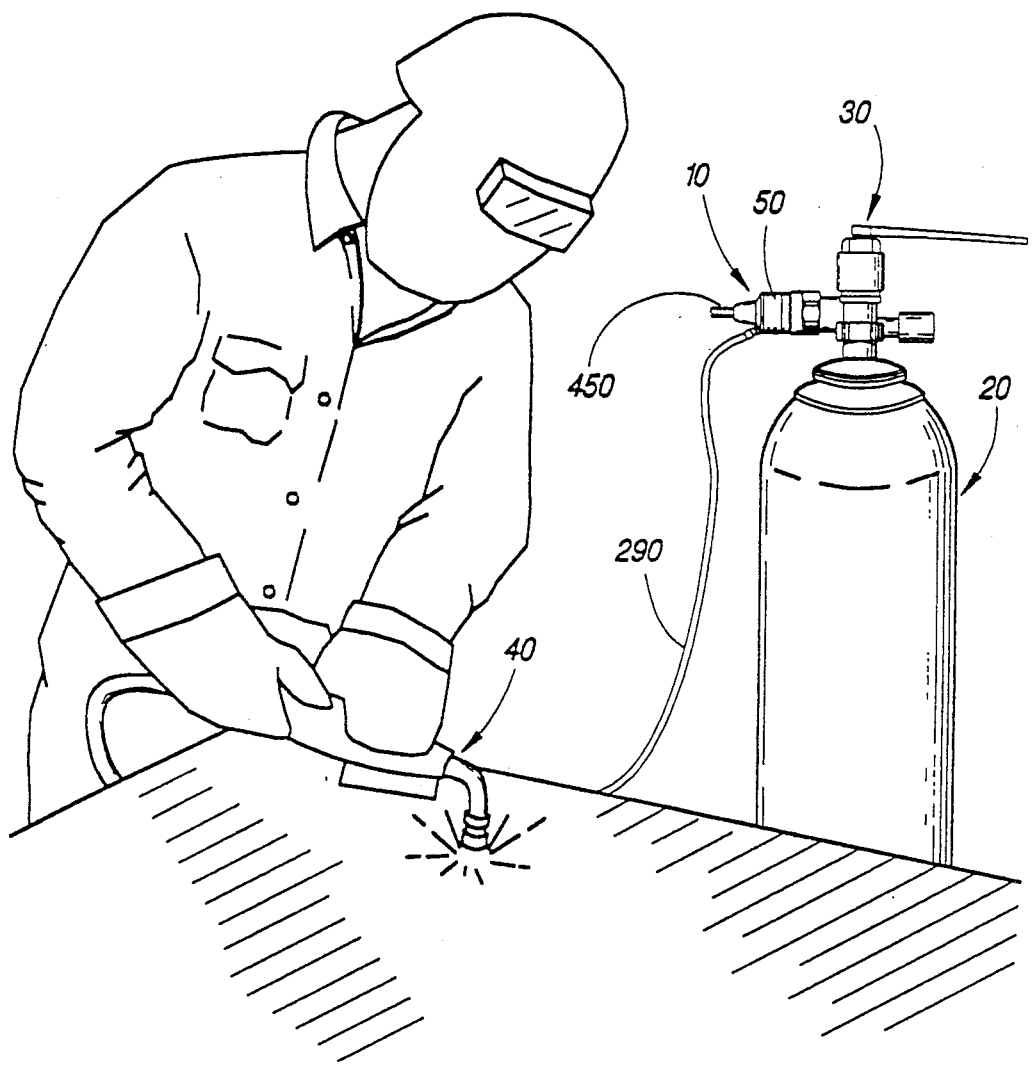
FIG. 1 is a perspective view showing the pressure regulator of the present invention connected to a pressurized cylinder upstream from a work station.
Figure 2:
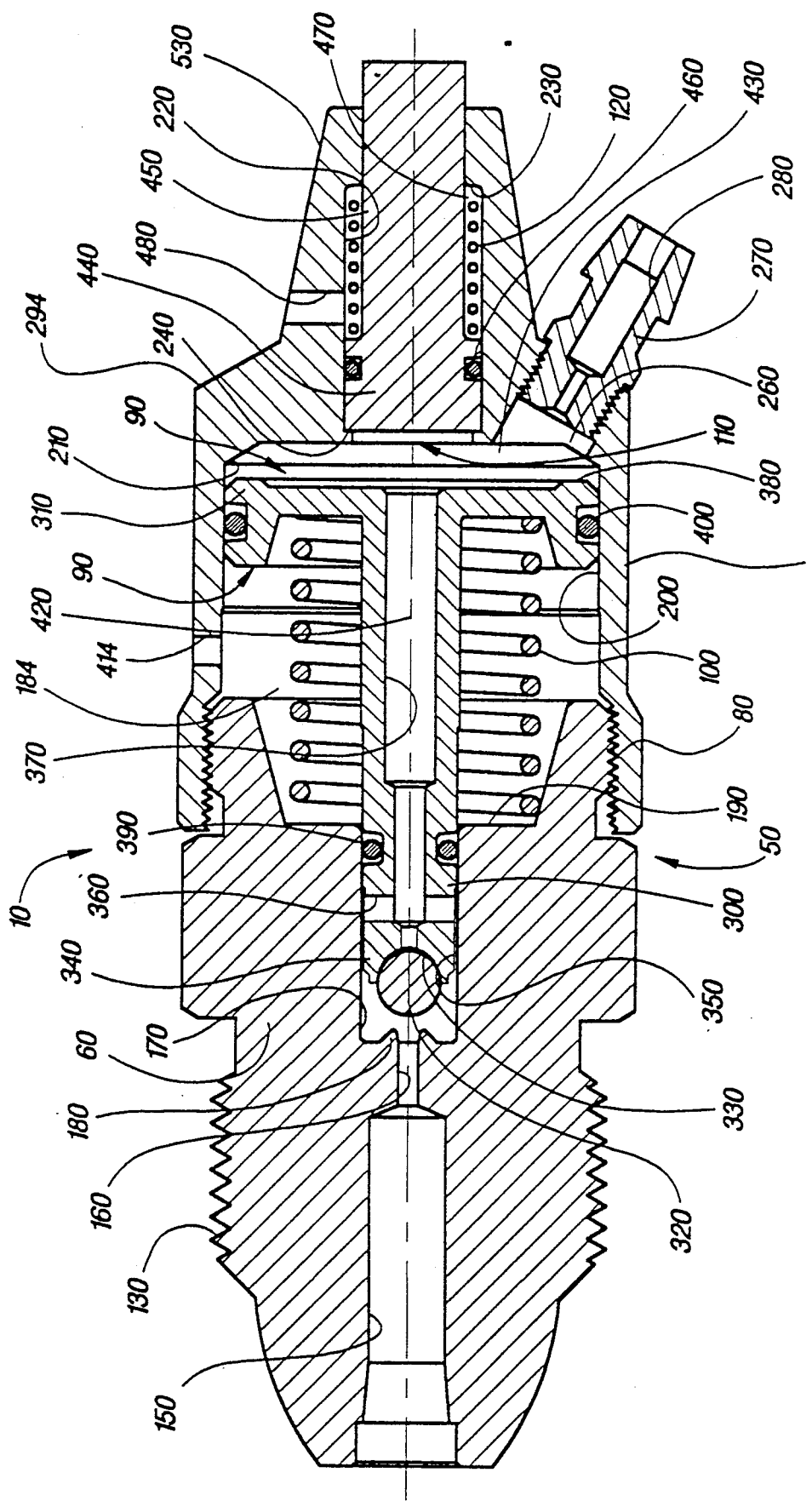
FIG. 2 is a cross sectional view of a preferred embodiment of the pressure regulator.

With reference to FIGS. 1 and 2, a pressure regulator embodying the present invention is generally designated as reference numeral 10. A compressed gas cylinder 20 and associated outlet valve 30 are shown in FIG. 1. The pressure regulator 10 is attached between the valve 30 and a work station 40.

With reference to FIG. 2, the pressure regulator 10 comprises a body 50 formed by an upstream member 60 and a cooperating downstream member 70. The members 60,70 are connected by threads 80. The upstream member 60 includes external threads 130 for fastening the pressure regulator 10 to the outlet valve 30 of a gas cylinder 20 in a known leak-proof manner.

Within the body 50, the pressure regulator 10 includes a regulator piston 90, a regulator piston biasing spring 100, an indicator piston 110, and an indicator piston biasing spring 120. The body 50 and pistons 90,110 are preferably machined of brass or other suitable material.

An inlet bore 150 is formed in the upstream member 60 to provide an inlet passage for gas exiting the outlet valve 30. A reduced diameter bore 160 joins the inlet bore 150 to a piston stem bore 170. An annular valve seat 180 is formed at the juncture of the reduced diameter bore 160 and the stem bore 170. A cavity 184 having a bottom wall 190 is formed in the upstream end of the member 60.

The member 70 has a piston bore 200 in its upstream end. The piston bore 200 includes a downstream tapered wall 210 which serves to limit the travel of the regulator piston 90. An indicator piston bore 220 is formed through the end of the member 70 into communication with the bore 200. The indicator piston bore 220 has a shoulder 230 for engaging the indicator piston biasing spring 120. Another shoulder 240 at the inner end of the bore 220 forms a stop for limiting the travel of the piston 110.

An internally threaded outlet passage 260 communicates with the regulator piston bore 200 adjacent the bore 220. An externally threaded nipple 270 having a central passage 280 is threaded into the passage 260 for connecting a hose 290 (FIG. 1) leading to the work station 40. The nipple is located on a shoulder portion 294 of member 70 radially outward of the bore 220.

The regulator piston 90 includes a stem 300 and a head 310. The stem and heads 300,310 slide in the bores 170,200, respectively. An upstream end 340 of the stem 300 carries an elastomeric seal 320 of TEFLON polytetrafloroethylene or other suitable material in the shape of a sphere. The spherical seal 320 is friction fit or otherwise retained in a complementary shaped recess 330 to face the seat 180. The end section 340 of the stem 300 has a diameter smaller than the surrounding piston bore 170 so that an annular passage 350 exists to permit fluid flow therebetween. A transverse hole 360 in the reduced diameter section 340 connects the annular passage 350 to an axial bore 370 which extends from the end face 380 of the piston head 310 to the recess 330. Elastomeric O-rings 390,400 are respectively fitted in grooves in the stem 300 and head 310 to seal against the wall of the bores 170,200, respectively. The regulator piston biasing spring 100 is fitted between the upstream side of the piston head 310 and the surface 190 to urge the regulator piston 90 in a downstream direction. The cavity 184 occupied by the spring 100 is vented to the atmosphere by a vent hole 414.

A flow path 420 is formed in the regulator 10 by the series of bores described above. From the upstream end to the downstream end of the regulator, the flow path 420 is defined by the inlet bore 150, the reduced diameter bore 160, the annular passage 350, the transverse hole 360, the axial bore 370, the piston bore 200, the outlet passage 260, and the central passage 280, respectively. A delivery chamber 430 in the member 70 is defined by the space between the regulator piston and the indicator piston.

The pressure regulating parts as described thus far form a conventional direct-acting regulator and operate in a well known manner to provide a predetermined regulated gas pressure at the outlet passage 260. The gas flows from the cylinder 20 to the inlet bore 150 and through the flow path 420 to the nipple 270. The gas pressure in delivery chamber 430 acting against the end face 380 of the piston 90 is balanced against the opposite force of the spring 100 and the gas pressure in the upstream end of the piston stem bore 170 acting on the relatively small axial area of the stem 300. The piston position, by governing the spacing between the seat 180 and the seal 320 controls the throttling effect of these elements and hence the delivery pressure of the gas.

If the gas pressure in the delivery chamber 430 increases above a desired level, the gas pressure acting against the piston face 380 and spring 100 will move the piston to the left as viewed in FIG. 2 and throttle the flow of gas passing from the reduced diameter bore 160 to the stem bore 170. If the pressure in the delivery chamber 430 decrease below the desired level, the spring 100 will move the piston 90 to the right thus increasing the flow through the reduced diameter bore 160. If flow through the outlet nipple 270 is stopped, the pressure buildup against the face 380 will move the piston 90 to the left to urge the seal 320 against the seat 180 thus preventing further flow of gas from the inlet bore 150 to the delivery chamber 430.

Figure 3:
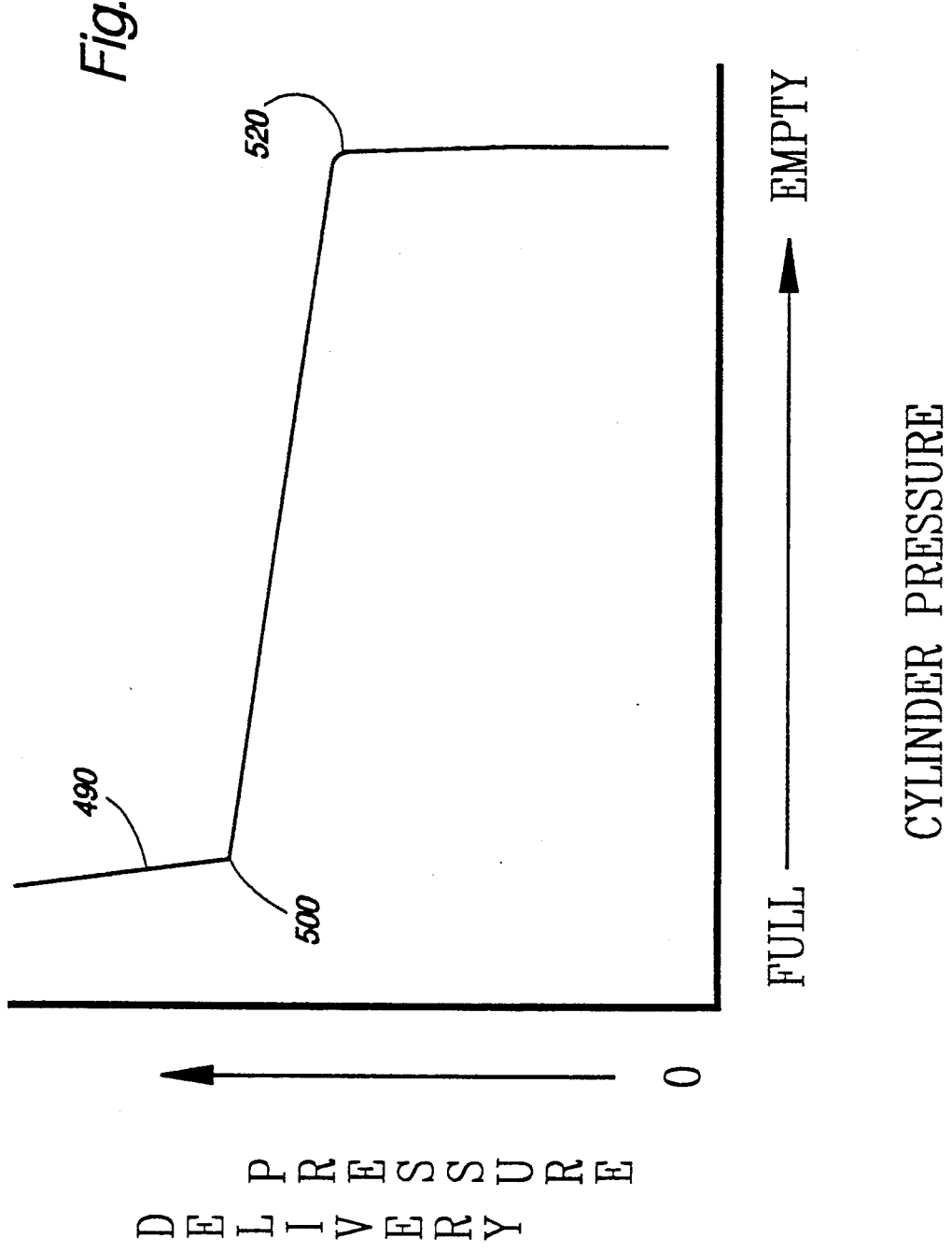
FIG. 3 is a graph of delivery pressure measured at the outlet of the pressure regulator of FIG. 2 as a function of cylinder pressure.

FIG. 3 is a graph characteristic of direct-acting regulators showing delivery pressure (the pressure in the delivery chamber 430) as it varies with respect to decreasing cylinder pressure.

The indicator piston 110 is comprised of a head 440 and a stem portion 450. The indicator piston spring 120 is fitted between the piston head 440 and the shoulder 230 so that the piston 110 is urged inward toward the shoulder 240. An O-ring 460 is fitted to a groove in the piston head 440 to form a seal between the piston 110 and the wall of the piston bore 220. A vent hole 480 is formed through the side of the member 70 to communicate with the bore 220. The vent hole 480 serves as an over-pressure relief port. If pressure greater than a predetermined level exists in the delivery chamber 430, the indicator piston 110 will be forced outward against the force of the spring 120 beyond the vent hole 480. The delivery chamber 430 will thus vent to the atmosphere until the delivery chamber pressure drops sufficiently to permit the return of the piston 110 inward of the vent hole 480 at which time the delivery chamber 430 is again sealed. Under ordinary operating conditions, the pressure in the delivery chamber 430 is insufficient to urge the piston 110 beyond the vent hole 480.

The operation of the vent hole 480 as an over pressure relief port is illustrated in the graph of FIG. 3. The line segment designated by reference numeral 490 represents a condition of sharply decreasing delivery pressure as a result of venting the delivery chamber 430. Reference numeral 500 indicates the level of delivery pressure where the indicator piston head 440 returns inward to seal the vent hole 480.

The stem 450 constitutes a visual indicator of the contents of the cylinder 20. In the preferred construction, the spring 120 is selected so that the piston 110 is relatively stationary with the stem 450 projecting beyond the end of the member 70 until the contents of the cylinder are nearly depleted. At a certain level of cylinder gas depletion designated by reference character 520 in FIG. 3, the rate of decrease of delivery pressure increases sharply. The delivery pressure drops sharply, and the spring 120 forces the piston to withdraw the stem 450 to a concealed position. The withdrawal of the stem extension 450 signals to the operator that a sufficient quantity of gas remains for only a short period of operation (for example, approximately ten minutes). The withdrawal of the indicator 450 is relatively rapid to avoid an ambiguous signal. Thus, the indicator 450 has only two significant positions: an extended position for indicating an adequate supply of gas and a withdrawn position indicating a nearly depleted cylinder.

The construction and arrangement of the stem 450 in the member 70 permits the state of the indicator 450 to be determined with a mere glance from a great distance. The indicator stem 450 is housed in a head portion 530 which projects axially outwardly from the body 50 opposite the inlet end of the regulator making the stem 450 visible from nearly all directions when extended. The indicator 450 may be brightly colored to enhance its visibility. The visibility of the indicator is not affected by the rotational position of the regulator as threaded on the outlet valve 30 since the profile of the regulator 10 is essentially the same from all sides.

The line segment between reference numerals 500,520 in FIG. 3 represents a time of ordinary operation conditions whereby gas is being consumed and the delivery pressure is sufficient to maintain the piston 110 urged outward against the spring 120 to visibly extend the indicator 450 from the body, yet not to the extent that the delivery chamber 430 is vented. During this time, the indicator piston 110 may move slightly and imperceptibly inward in response to the decrease in delivery pressure. However, the stem extension 450 remains substantially fully extended throughout this time to indicate to the operator that an adequate supply of gas remains in the cylinder 20. It will thus be understood that the selection of the stiffness of the spring 120 and the area of the indicator piston 110 chiefly determines the operating characteristics of the indicator stem 450.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a direct-acting pressure regulator having an inlet, an outlet, a pressure chamber communicating with said outlet and a pressure regulating piston means including an inlet seal, said piston means establishing a fluid flow path from said inlet to said delivery chamber and being movable in response to decreasing inlet pressure to open said inlet and maintain a regulated pressure in said chamber, the improvement comprising:

pressure-operated reciprocal indicator means having an end face operatively exposed to said chamber and an opposite end portion which is adapted to visibly extend from said regulator until the regulated pressure in said chamber reaches a predetermined lower limit, said indicator means having a substantially fully extended position for visibly indicating adequate gas pressure; and spring means acting on said indicator means to force it into said regulator to a withdrawn position wherein said opposite end portion is hidden from view, said spring being selected in relation to the regulated pressure in said chamber such that said indicator means rapidly moves from said fully extended position to said withdrawn position when said pressure reaches said lower limit.

2. A pressure regulator adapted to be connected to a compressed gas cylinder comprising:

a body comprising an inlet end, a delivery chamber and an outlet passage;

a flow path between said inlet end and said outlet passage;

regulating means in said flow path for maintaining regulated pressure in said delivery chamber as the pressure at said inlet decreases to a predetermined lower limit when the cylinder is near depletion;

indicator means slidably disposed within said body, said indicator means being urged in a first direction by spring means and in a second direction opposite to said first direction by gas pressure in said delivery chamber;

said indicator means including an indicator member which is readily visible and substantially fully extended in one of said first and second positions and substantially hidden in the other of said first and second positions, and wherein said indicator member signals said predetermined level of depletion by rapidly switching from said first position to said second position.

3. A pressure regulator according to claim 2 wherein said indicator means comprises a head portion and an stem portion integral with said head portion, said stem portion defining said indicator member.

4. A pressure regulator adapted to be coupled to an outlet valve of a compressed gas cylinder comprising:

a body comprising an inlet end, a delivery chamber, and an outlet passage;

a flow path comprising an inlet end and said outlet passage;

regulating means for regulating the pressure in said delivery chamber, said regulating means comprising a spring-biased regulating piston controlling a throttling means for regulating flow in said flow path wherein gas pressure at said inlet end creates an opening force on said piston tending to open said throttling means and gas pressure in said outlet chamber creates a force on said piston tending to close said throttling means;

an indicator piston slidably disposed within said body, said indicator piston having a portion adapted to indicate adequate pressure in said cylinder when said indicator piston is in an outer substantially fully extended visible position and to substantially fully withdrawn inside said body in a substantially hidden position when said indicator piston is in an inner position, wherein said indicator piston is urged by a spring means toward its inner position and wherein an end face of aid indicator piston is in communication with said delivery chamber such that gas pressure in said delivery chamber urges said indicator piston in the direction of its outer position opposite to the force of said spring means, and wherein said spring means and said indicator piston are constructed and arranged such that the imminent depletion of said storage cylinder is signalled by the rapid withdrawal of said indicator portion from said visible position to said hidden position.

5. A pressure regulator adapted to be coupled to an outlet valve of a compressed gas cylinder comprising:

a body comprising an inlet end, a delivery chamber, and an outlet passage;

a flow path between said inlet end and said outlet passage;

regulating means for regulating the pressure in said delivery chamber, said regulating means comprising a spring-biased regulating piston controlling a throttling means for regulating flow in said flow path wherein gas pressure at said inlet end creates an opening force on said piston tending to open said throttling means and gas pressure in said outlet chamber creates a force on said piston tending to close said throttling means; and an indicator piston slidably disposed within said body, said indicator piston having a portion adapted to extend outside said body in a readily visible manner when said indicator piston is in an outer position and substantially withdrawn inside said body in a substantially hidden position when said indicator piston is in an inner position, wherein said indicator piston is urged by a spring means toward its inner position and wherein an end face of said indicator piston is in communication with said delivery chamber such that gas pressure in said delivery chamber urges said indicator piston in the direction of its outer position opposite to the force of said spring means, and wherein said spring means and said indicator piston are constructed and arranged such that the imminent depletion of said storage cylinder is signalled by the withdrawal of said indicator portion from said visible position to said hidden position, wherein said body comprises a housing portion forming an end of said regulator opposite said inlet end, said housing portion defining a first cylinder for slidably receiving said indicator piston and a second cylinder for slidably receiving said regulator piston, and wherein said first and second cylinders are concentric.

6. A pressure regulator according to claim 5 wherein said housing portion comprises a head section projecting axially outward from the end of said regulator opposite said inlet end, and wherein said head section houses said indicator piston.

7. A pressure regulator adapted to be connected to a compressed gas cylinder comprising:
   a body having an inlet end, a delivery chamber, and an outlet passage, said body comprising a housing portion forming an end of said regulator opposite said inlet end, said housing portion defining a first cylinder for slidably receiving said indicator means and a second cylinder for slidably receiving a regulator piston, wherein said first and second cylinders are concentric and wherein said housing portion is threaded to a cooperating base portion which forms said inlet end;
   regulating means for regulating the pressure in said delivery chamber;
   a pressure operated movable indicator means having a portion operatively exposed to said chamber and a stem which is axially extendable from an end of said body opposite said inlet end and a means acting on said indicator means to change its position with respect to said body to indicate the depletion of said cylinder; and
   wherein said regulator piston comprises a stem portion and a head portion, and wherein said stem portion is slidably received within a cylinder formed in said base portion.

* * * * *